United States Patent
Gallienne et al.

(10) Patent No.: US 9,272,649 B2
(45) Date of Patent: Mar. 1, 2016

(54) ANGLE ADJUSTMENT DEVICE FOR VEHICLE SEAT

(75) Inventors: Didier Gallienne, Landigou (FR); Damien Grimaud, Le Coudray Montceaux (FR); Arnaud Searles, Caen (FR)

(73) Assignee: Faurecia Sièges d'Automobile, Nanterre (FR)

( * ) Notice: Subject to any disclaimer, the term of this patent is extended or adjusted under 35 U.S.C. 154(b) by 427 days.

(21) Appl. No.: 13/473,244

(22) Filed: May 16, 2012

(65) Prior Publication Data

US 2013/0001997 A1 Jan. 3, 2013

(30) Foreign Application Priority Data

Jun. 28, 2011 (FR) ...................................... 11 55770

(51) Int. Cl.
| | |
|---|---|
| *B60N 2/235* | (2006.01) |
| *B60N 2/68* | (2006.01) |
| *B60N 2/22* | (2006.01) |
| *B60N 2/225* | (2006.01) |
| *B60N 2/44* | (2006.01) |

(52) U.S. Cl.
CPC .............. *B60N 2/682* (2013.01); *B60N 2/2227* (2013.01); *B60N 2/2252* (2013.01); *B60N 2/2356* (2013.01); *B60N 2/4435* (2013.01); *B60N 2205/50* (2013.01)

(58) Field of Classification Search
CPC .. B60N 2/2227; B60N 2/2252; B60N 2/2356; B60N 2/682; B60N 2/4435; B60N 2205/50
USPC ........................................................ 297/362
See application file for complete search history.

(56) References Cited

U.S. PATENT DOCUMENTS

| | | | |
|---|---|---|---|
| 5,209,637 A | 5/1993 | Reubeuze | |
| 5,634,474 A | 6/1997 | Grippi | |
| 5,634,689 A * | 6/1997 | Putsch et al. | ............... 297/362 X |
| 7,322,654 B2 * | 1/2008 | Kawashima | .................. 297/362 |
| 7,677,667 B2 | 3/2010 | Peters et al. | |

FOREIGN PATENT DOCUMENTS

| | | |
|---|---|---|
| DE | 2 255 549 | 11/1972 |
| DE | 44 36 101 A1 | 6/1995 |
| DE | 10 2006 015 560 B3 | 8/2007 |
| FR | 2 770 810 A1 | 5/1999 |
| FR | 2 780 111 A1 | 12/1999 |
| FR | 2 887 194 A1 | 12/2006 |

(Continued)

OTHER PUBLICATIONS

Preliminary Search report for related French Application No. FR 11 55770; report dated Feb. 13, 2012.

*Primary Examiner* — Anthony D Barfield
(74) *Attorney, Agent, or Firm* — Miller, Matthias & Hull LLP

(57) ABSTRACT

A hinge of an automotive vehicle seat for adjusting the angle of a seat back relative to a seat bottom about a hinge axis, comprising first and second plates, a control device adapted to move locking elements which immobilize the first plate relative to the second plate, a control shaft adapted to cause said control device to rotate on the axis, wherein the control shaft is held in the direction of the main axis by a snap-in means, such that the control shaft can be assembled manually without tools.

12 Claims, 7 Drawing Sheets

(56) References Cited

FOREIGN PATENT DOCUMENTS

| | | |
|---|---|---|
| FR | 2 908 090 A1 | 5/2008 |
| FR | 2 926 644 A1 | 7/2009 |
| GB | 734969 | 8/1955 |
| WO | WO-2011/088969 A1 | 7/2011 |

* cited by examiner

ANGLE ADJUSTMENT DEVICE FOR VEHICLE SEAT

CROSS-REFERENCE TO RELATED APPLICATIONS

This application claims priority under 35 USC §119 and the Paris Convention to French Patent Application No. FR 11 55770, filed on Jun. 28, 2011.

FIELD OF THE DISCLOSURE

The invention relates to hinge mechanisms and angle adjustment devices for a vehicle seat, and particularly concerns seat back hinges which enable continuous or stepwise adjustment.

BACKGROUND OF THE DISCLOSURE

More specifically, the invention relates to a hinge for an automotive vehicle seat which allows adjusting the angle of a first seat element relative to a second seat element about a primary hinge axis, and comprising:
first and second hinge plates, intended to be rigidly and respectively attached to said first and second seat elements,
a control device which allows to move the first hinge plate relative to the second hinge plate,
a control shaft, received in axial openings in the first and second hinge plates, and received in an axial opening in the control device.

Such a seat hinge mechanism is known from document FR2908090; in that document, however, the attachment of the control shaft relative to the control device requires the use of specific tools such as a welding tool.

SUMMARY OF THE DISCLOSURE

One aim of the invention is to improve the seat hinge mechanisms to avoid the need for a specific tool to assemble the control shaft with the control device.

To achieve this, in a seat hinge of the type in question according to the invention, the control shaft is held along the direction of the primary axis by a snap-in means. The snap-in means comprises elastic plastic tabs having free ends which can move radially, and the control shaft comprises at least one stop element adapted to stop the control shaft in a first axial direction, while free ends of the plastic tabs come in stopping configuration to stop the control shaft in a second axial direction opposite said first axial direction, such that the control shaft can be assembled manually without tools.

In various embodiments of the invention, one or more of the following arrangements may be used:
the control device is adapted to move locking elements which immobilize the first hinge plate relative to the second hinge plate, and the control shaft is adapted to rotate said control device about the main axis;
the plastic tabs are arranged on the control shaft;
the control shaft comprises a connecting rod, a control hub, and an annular ring supporting said elastic plastic tabs; such that the assembly is easy and inexpensive to perform;
the control hub is fitted or crimped onto the connecting rod, the annular ring being axially placed between the control hub and the connecting rod; such that the assembly is easy and inexpensive to perform;
the annular ring comprises three tabs of different lengths; such that differences in dimension along the axis Y can be accommodated;
the control hub comprises three lobes projecting radially outwards and arranged along the circumference about 120° apart from each other, and the annular ring comprises three elastic plastic tabs each arranged along the circumference between two lobes;
the control device comprises: a cam adapted to push the locking elements outwards into the locked position, and having grooves; and a control plate adapted to move said locking elements inward to the unlocked position, and having driving lugs housed in said grooves.
the control device is in the form of an eccentric cam having hypocycloid gearing formed by a first set of teeth connected to the first plate and a second set of teeth connected to the second plate.

Another object of the invention is an angle adjustment device for a vehicle seat, comprising a first hinge as described above, the control device of the first hinge being a first control device and the control shaft for the first hinge being a first control shaft, said adjustment device additionally comprising a second hinge comprising:
third and fourth hinge plates intended to be rigidly and respectively attached to the first and second seat elements,
a second control device adapted to move second locking elements which immobilize the third hinge plate relative to the fourth hinge plate,
the control shaft being received in axial openings of the third and fourth hinge plates, and received in an axial opening in said second control device, and adapted to cause the second control device to rotate about the main axis,
wherein the control shaft is returned to a rest position by a return element, and the second control device is returned to a locked position by a spring, the rest position being separated by a predefined angle of play from the position in which the control shaft applies force to the second control device starting from its locked position.

In particular, the first seat element may be a seat bottom and the second seat element may be a seat back.

Another object of the invention is a vehicle seat comprising a seat bottom, a seat back, and at least one hinge as described above or an angle adjustment device as defined above.

BRIEF DESCRIPTION OF THE DRAWINGS

Other features and advantages of the invention will be apparent from reading the following description of two embodiments of the invention, provided as non-limiting examples. The invention will also be better understood by referring to the attached drawings, in which.

DETAILED DESCRIPTION OF THE DISCLOSURE

The same references are used to denote identical or similar elements in the various figures.

Figure 1:
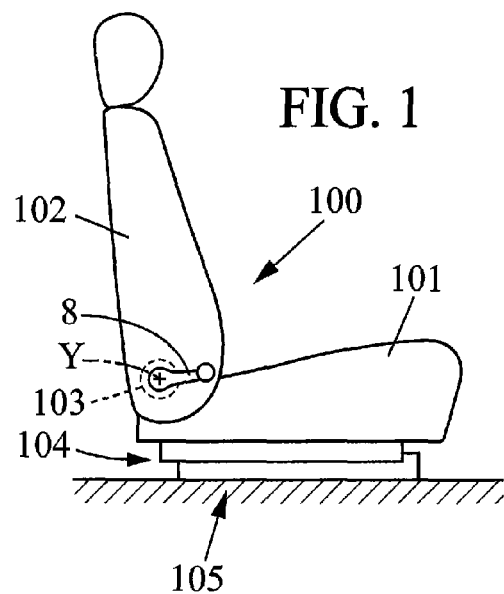
FIG. 1 is a general view of a vehicle seat equipped with a hinge mechanism according to a first embodiment of the invention.

FIG. 1 shows an automotive vehicle seat 100 comprising a seat back 102 which is mounted on a seat bottom 101 so as to pivot on a transverse horizontal pivot axis Y, also called hinge axis; the seat bottom 101 is mounted on the floor of the vehicle 105, if applicable by means of longitudinal sliders 104. In addition, in the hinge mechanism 103 area, there is provided a control handle 8 which allows a user to adjust the angle of the seat back relative to the seat bottom, and more generally a first seat element relative to a second seat element.

Figure 2:
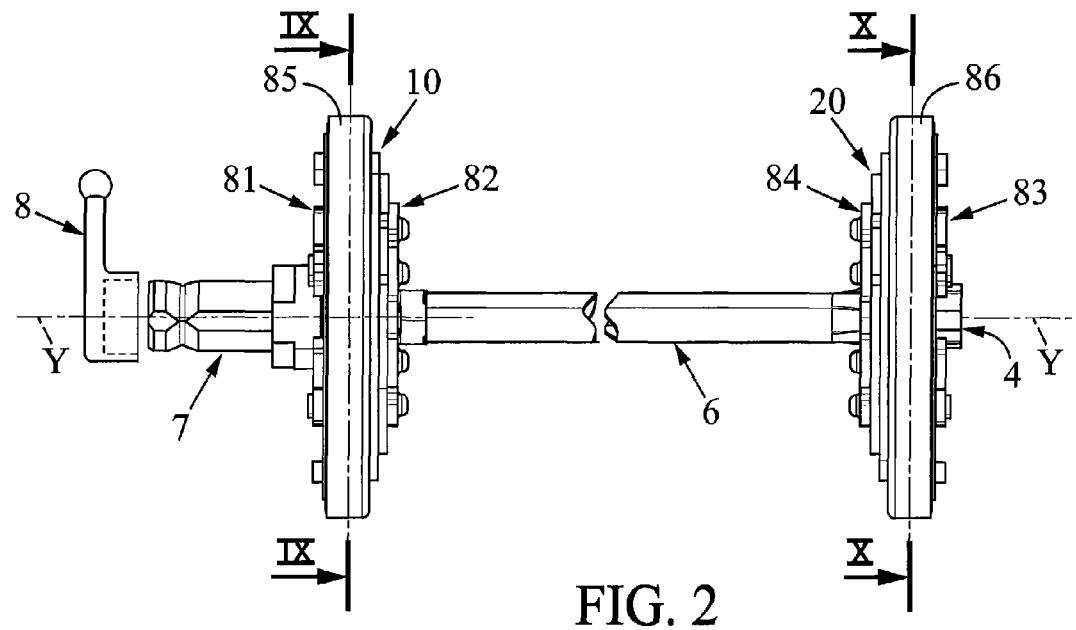
FIG. 2 is a front view of an angle adjustment device used in the seat of FIG. 1, comprising first and second hinges.
Figure 3:
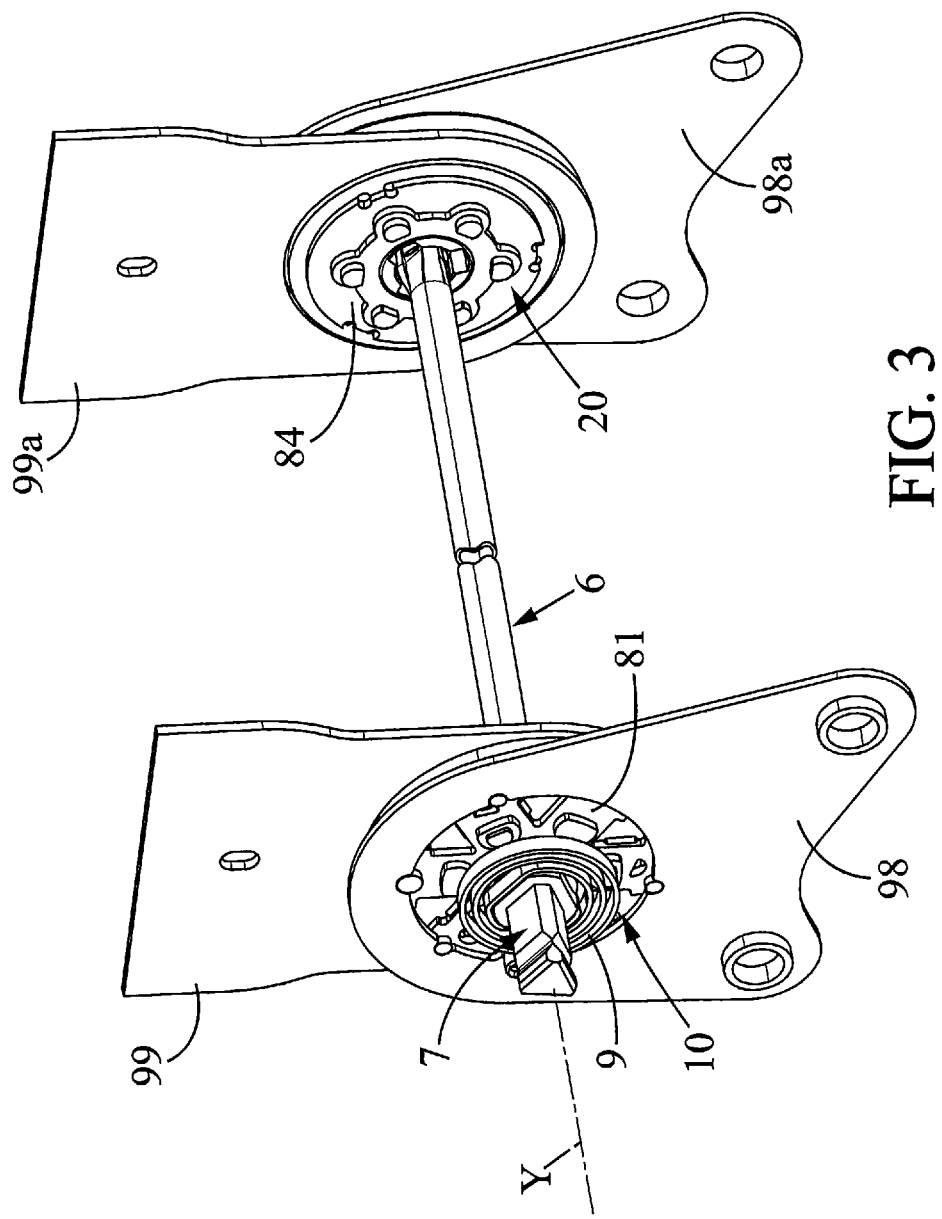
FIG. 3 represents a perspective view of the device of FIG. 2.

The pivoting of the seat back 102 is made possible by an angle adjustment device, represented in FIGS. 2 and 3, comprising a first hinge 10, on the right side of the seat, and a second hinge 20, optional in the invention, on the left side of the seat, both actuatable in a synchronized manner by the control handle 8 located on the right side or any other actuating device.

These first and second hinges 10, 20 are adapted to prevent the seat back 102 from pivoting relative to the seat bottom 101 when in the normal usage position, and are also adapted to allow rotational movement of the seat back when the user actuates the control handle 8.

Note that the first hinge 10, and if applicable the second hinge 20, may be used to connect any seat element to another seat element and not necessarily the seat bottom and the seat back.

As represented in FIGS. 2 to 10, the first hinge 10 comprises first and second hinge plates 81, 82 respectively attached to the frame of the seat bottom 98 and to the frame of the seat back 99. These two plates 81, 82 may be substantially circular in shape and be joined to each other by a tightly fitting external metal ring 85 thus delimiting an internal space which contains a locking device comprising one or more locking elements 12 each equipped with external teeth 12a. The second plate 82 comprises a peripheral annular region 87 having a toothed surface 88 directed radially inwards and facing the external teeth 12a of the locking elements 12.

Each locking element 12 can move radially, within guides 14 that are part of the first plate 81, between a locked position (FIGS. 9 and 10) where the teeth 12a of the locking element 12 engage with the toothed surface 88 that is part of the second plate 82, and an unlocked position (FIG. 6) where the locking element 12 is moved radially inward so that its teeth 12a do not mesh with the toothed surface 88 of the second plate 82, thus allowing the second plate 82 to rotate relative to the first plate 81.

Figure 9:
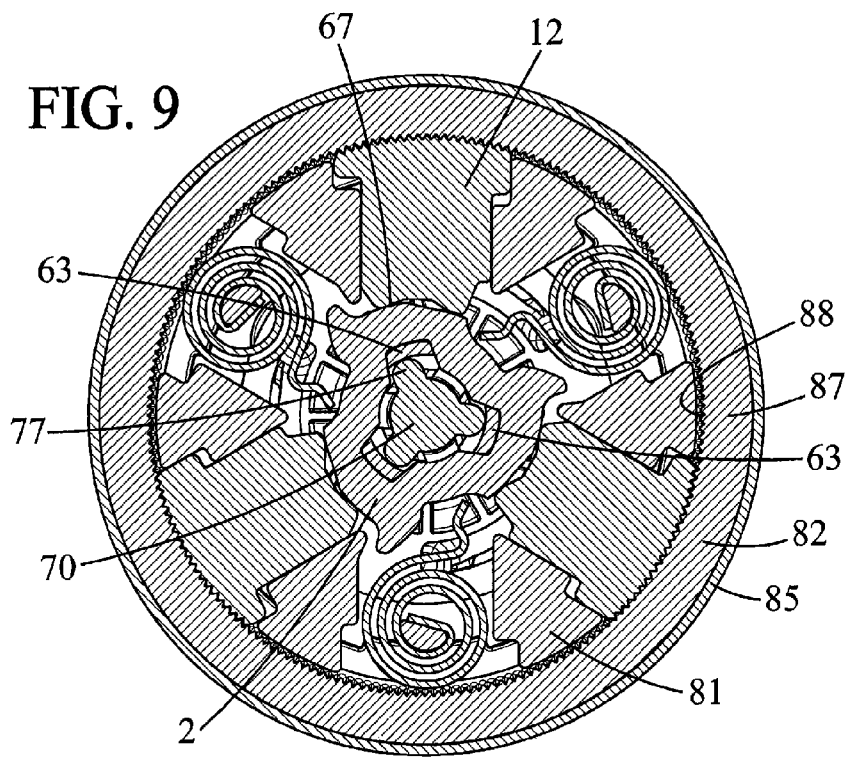

The first hinge 10 additionally comprises a control device 11 assembled to pivot about axis Y and adapted to move the locking elements 12 between their locked position and their unlocked position. This control device 11 comprises a control plate 1 and a cam 2, and elastic force is applied by one or more springs 19 towards a locked position in which the cam 2 pushes the radially corresponding locking element 12 outward towards the locked position (FIG. 9).

This control device 11 can be rotated by actuating the handle 8 to an unlocked position (FIG. 6) where said control plate 1 drives the locking element 12 to move preferably radially inward to the unlocked position.

Said control plate 1 may be metallic or may be made of plastic. It comprises a flat disk of constant thickness for which the normal and the axis align with the main hinge axis Y, and a central double-walled cylinder 39 centered on Y and having driving lugs 63 extending substantially parallel to Y. Said control plate 1 comprises:

- a central opening 13 delimited by an inner edge,
- at least one bean-shaped opening, and in the represented example, three identical openings 16 distributed over a circle close to an outer circular edge 65 of the control plate 1, each opening 16 having a shoulder 15 that is sloped relative to a circle centered on axis Y.

Said cam 2 is preferably of metal and is a thick disk extending perpendicular to the main axis Y, and comprises:

- a central opening 13a defining an inner edge from which grooves 18 extend radially outward,
- three sloped sides 67 forming the cam portion on the peripheral part of the cam and adapted to push the locking element 12 back outward.

Figure 6:
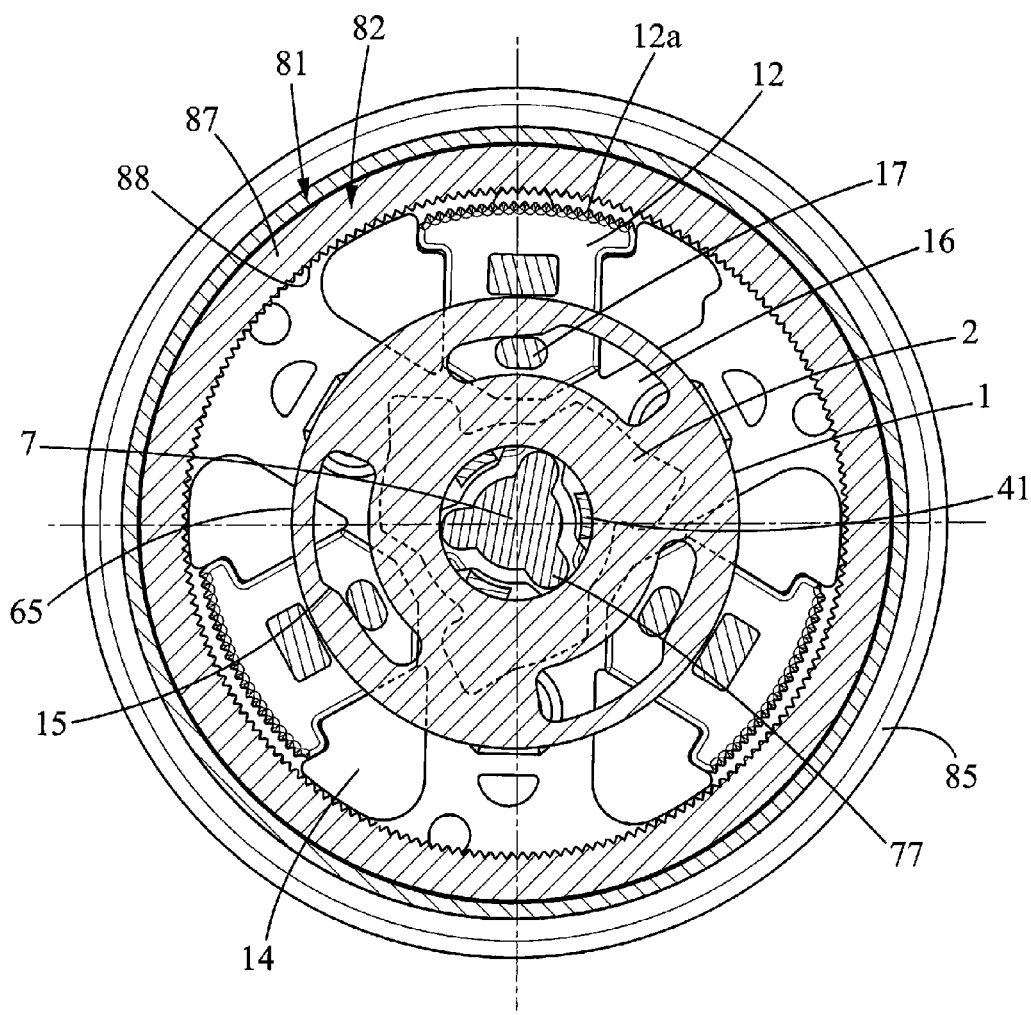
FIG. 6 is an enlarged partial cross-sectional view of the first hinge, along plane VI-VI of FIG. 5, FIGS. 7 and 8 represent a perspective view of the partial views of the first hinge of FIG. 2, FIGS. 9 and 10 are enlarged cross-sectional views of the first and second hinges respectively, along the respective planes IX-IX and X-X of FIG. 2.
Figure 7:
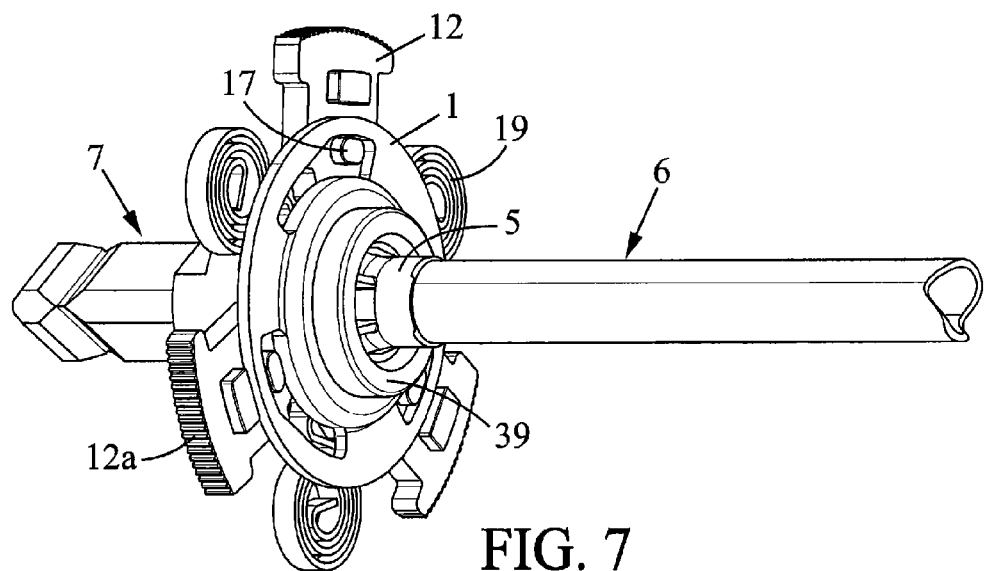

As represented in particular in FIG. 6, for the unlocked position, the radially inward movement of the locking element 12 is forced by the shoulder 15 of the opening 16 in the control plate 1 in which a pin 17 that is part of the locking element 12 is engaged; similarly, for the locked position, as represented particularly in FIG. 9, the radially outward movement of the locking element 12 is forced by the sloped side 67 forming the cam portion of the cam 2.

Figure 10:
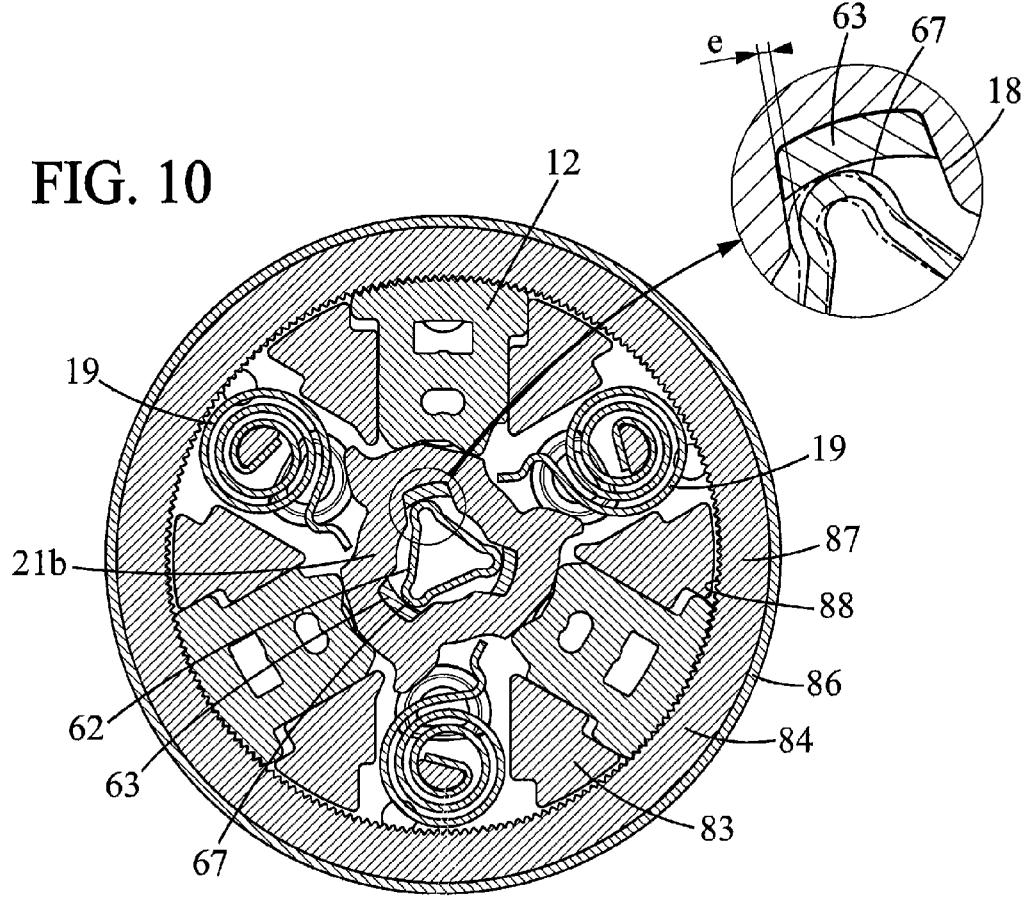

Said cam 2 and said control plate 1 are held together to form the control device 11, the driving lugs 63 being housed with substantially no play within the grooves 18, as is illustrated in FIG. 10. The rotation of the cam 2 thus drives the rotation of the control plate 1.

The control device 11, in particular the cam 2, is returned to the locked position by at least one return spring 19; there are three coil springs 19 in the illustrated example.

The first hinge 10 additionally comprises a control shaft 3 adapted to cause the control device 11 to rotate, in particular when the user applies force to the control handle 8.

Figure 4:
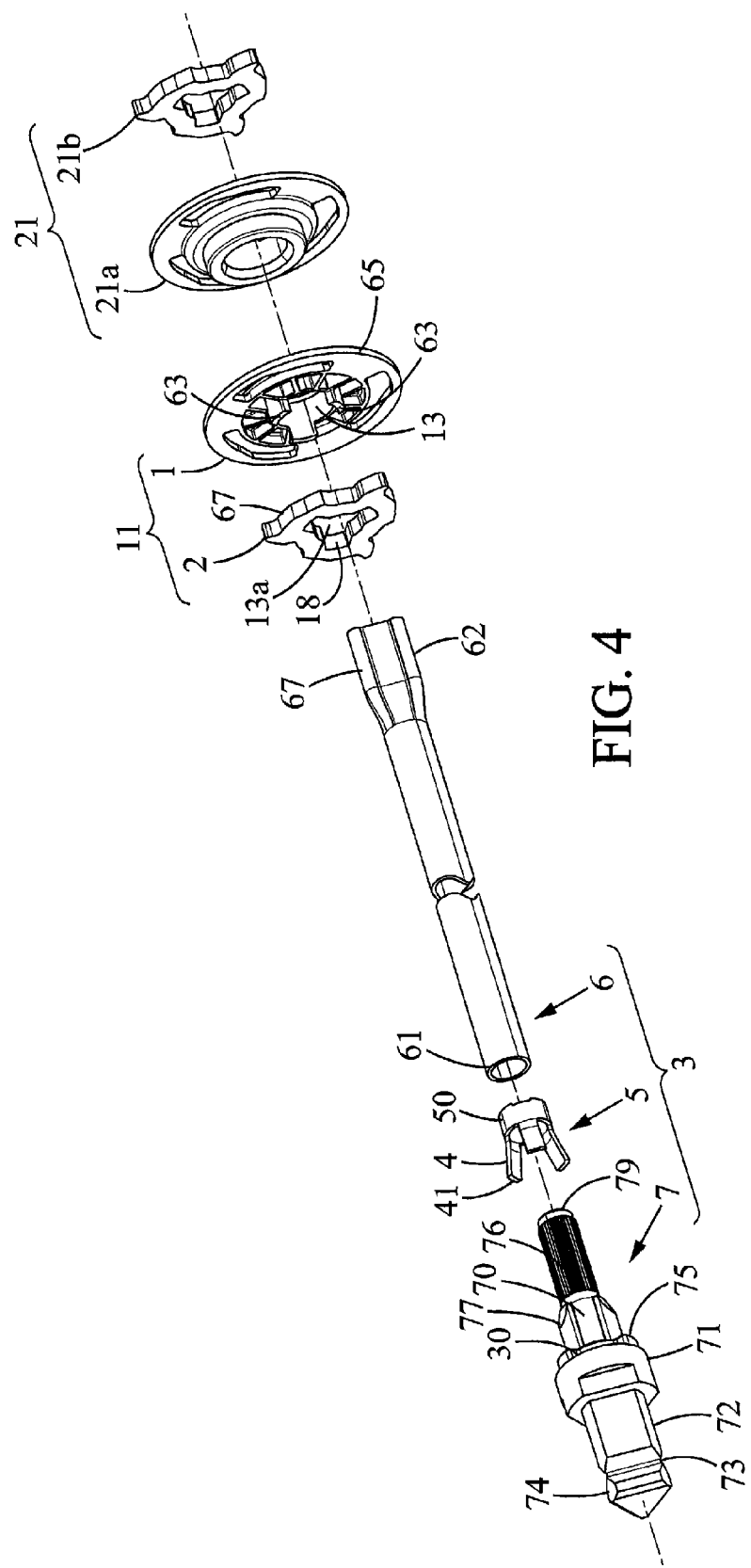
FIG. 4 represents a perspective view of a control shaft and control device according to one embodiment.
Figure 5:
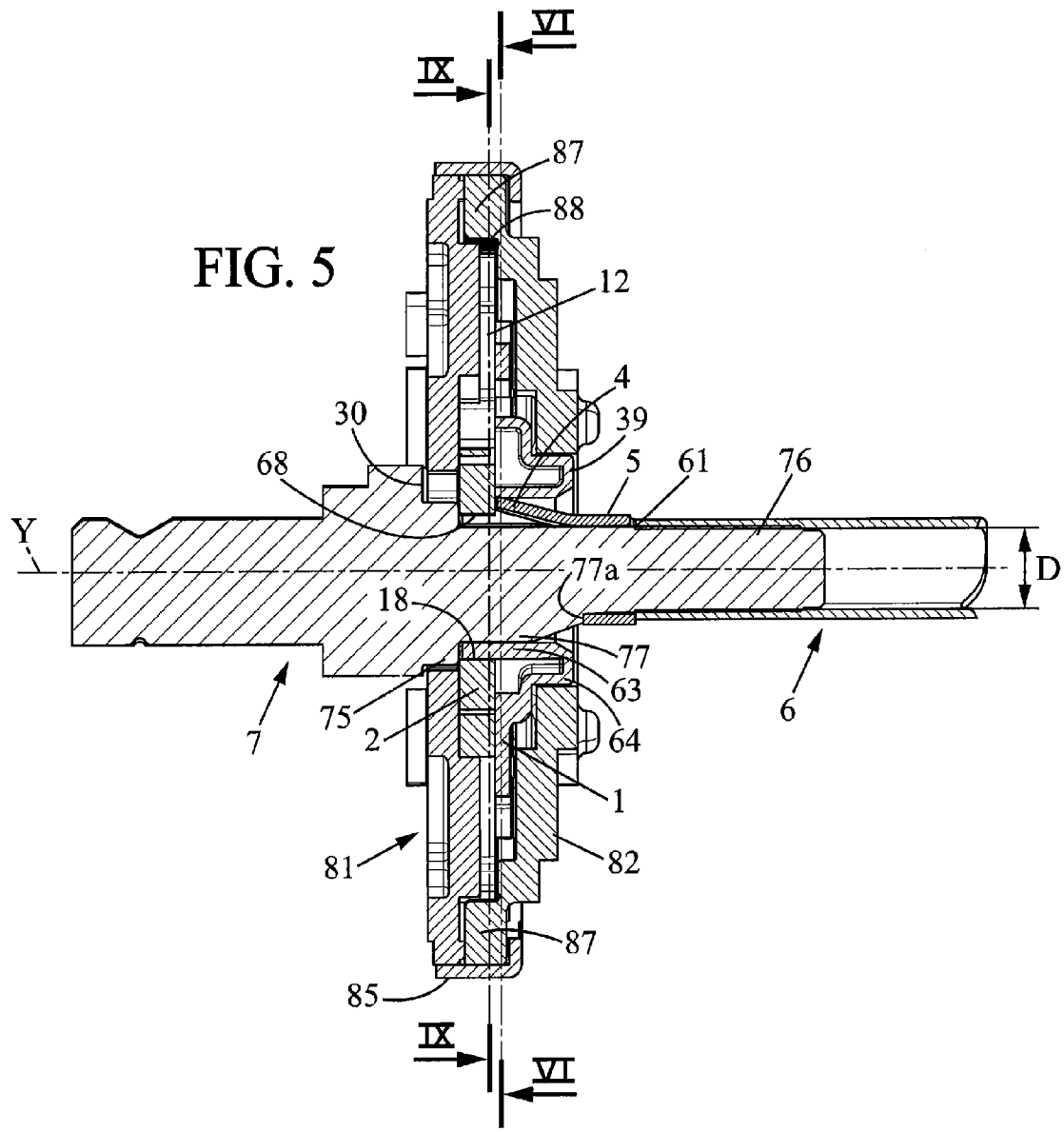
FIG. 5 is a cross-sectional axial view of the hinge mechanism.

This control shaft 3, represented in detail in particular in FIGS. 4 and 5, comprises:

- a control hub 7,
- an annular ring 5,
- a connecting rod 6.

The control hub 7 is preferably a part made of forged or machined metal, which extends along the main axis Y between a first end 74, having a triangular cross-section in the example illustrated, onto which the control handle 8 is fitted, and a second end 79 located at the opposite end.

Starting from the first end 74, the control shaft 3 comprises:

- a substantially triangular portion 72 with a narrowed portion 73 for receiving a circlip rigidly attached to the control handle 8 in order to hold it firmly in place, to allow the handle 8, which has a corresponding complementary internal triangular shape, to apply a driving force,
- a substantially circular section 71, having a neck 30 directed towards the second end 79,
- a drive portion 70 having three outwardly projecting lobes 77 distributed at equal distances around about the axis, for example 120°,
- a serrated portion 76, adapted to be received in a tube formed by the connecting rod.

In addition, three rotation stops 75 are arranged between the drive portion 70 and the circular section 71.

The control shaft 3 is returned to a rest position (FIGS. 9 and 10) by at least one return spring 9, which is a coil spring 9 in the example illustrated here. This rest position is defined by the rotation stops 75 which press up against their corresponding counterparts in the first plate 81.

The annular ring 5 is preferably made of plastic and comprises a cylindrical band 50 having an internal diameter substantially corresponding to the outer diameter of the serrated portion 76. Three elastic tabs 4 extend from a longitudinal edge of this band, each one slightly angled with regard to the axial direction Y. Each elastic tab 4 comprises a free end 41 (see FIG. 4).

The connecting rod 6 is preferably of metal and optionally connects the first hinge 10 to a second hinge positioned on the opposite side of the seat.

It is important to note, although this case is not represented in the figures, that a single hinge 10 can be used to implement the invention, and in this case the connecting rod is reduced to a simple sleeve force fitted onto the serrated portion of the control hub.

When, as represented, the connecting rod 6 connects the first hinge 10 to the second hinge 20, this rod comprises a cylindrical tube centered on Y having an internal diameter D and a simple first end 61. On the opposite end 62 is arranged a substantially triangular shape 62 having projecting lobes 67 similar to those 77 already described for the control hub 7.

Figure 8:
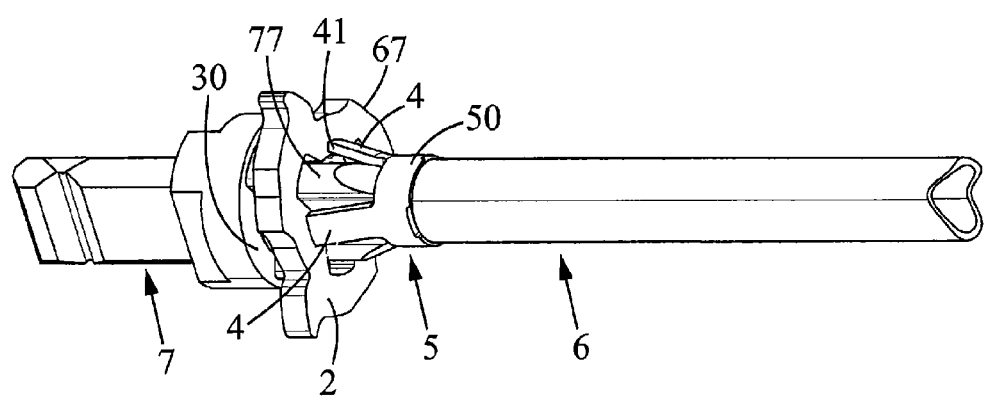

For the device assembly method, with reference to FIGS. 4 to 7 in particular, the control shaft 3 is first prepared before insertion. The annular ring 5 is first slided onto the serrated portion 76 of the control hub 7, taking care to position the ring around Y so that each tab 4 is at an equal distance from the lobes 77, in order to obtain alternating tabs 4 and projecting lobes, as can be seen in FIG. 8.

Then the connecting rod 6 is force fitted onto the serrated portion 76. As an alternative to said force fitting, the tube of the connecting rod 6 may have an inner diameter D that is slightly greater than the outside diameter of the serrated portion 76 and a crimping operation then rigidly attaches the connecting rod 6 to the control hub 7, while immobilizing the ring 5 placed and sandwiched between the end 61 of the tube and a shoulder 77a arranged at the end of the lobe 77.

To install the control shaft 3 in the hinge 10, the second end 62 is inserted through the axial openings 13,13a until said second end 62 reaches the second hinge.

The elastic tabs 4, when they reach the opening 13a of the cam 2, are then pushed radially inwards. The insertion movement continues until the stop element 30 presses against the first plate 81 (FIG. 5). In this position, the elastic tabs 4 are released and their free ends 41 move apart due to their inherent elasticity and press against the lateral face of the cam (FIG. 8), so that the snap-in means 4 holds the control shaft 3 in the direction of the main axis Y, preventing any relative displacement between said control shaft 3 and said control device 11 in the direction of the main axis Y.

As a result, the previously prepared control shaft 3 can be assembled manually onto the hinge 10 without tools.

More specifically, the control shaft 3 is stopped in a first axial direction by the stop element 30, and the free ends 41 of the plastic tabs stop the control shaft 3 in a second axial direction that is opposite the first axial direction.

There is thus no need to provide axial immobilization at the second hinge 20.

Advantageously according to the invention, the three elastic tabs have slightly different lengths, which allows taking into account differences (manufacturing deviations) in dimension along axis Y. To avoid any play which can lead to noise, the length of the three tabs differs so that one, two or three tabs are released at the end of the path traveled. If the thickness of the hinge 10 is at the upper tolerance, a single tab is released but this is sufficient to ensure the snap-in function. If the thickness of the hinge 10 is at the lower tolerance, three tabs are released, the one released last minimizing the play along Y.

Also note that if the handle must be positioned on the left side of the seat, the same control shaft 3 can be inserted from the opposite side, while the control device 11,21 remain completely identical.

Note that without exceeding the scope of the invention, any other snap-in means fulfilling a similar function can be used.

The angle adjustment device of the invention may comprise, as already mentioned, a second hinge 20 which is a symmetrical image of the first hinge 10 relative to axis Y and is positioned on the opposite side of the seat relative to the first hinge 10; this second hinge 20 is similar or identical to the first hinge, except for certain aspects which are detailed below.

As represented in FIGS. 2, 3, 4 and 10, the second hinge 20 comprises:
  third and fourth plates 83, 84 similar to the first and second plates 81,82 and respectively attached to the frame of the seat bottom 98a and the frame of the seat back 99a, these being rigidly attached to the aforementioned frame of the seat bottom 98 and of the seat back 99 respectively, with a peripheral tightly fitted ring 86 in addition,
  a second control device 21, comprising a control plate 21a similar to the control plate 1 of the first hinge 10 and a cam 21b similar to the first cam 2 of the first hinge 10,
  second locking elements 12 similar to the locking elements 12 of the first hinge 10,
  at least one return spring 19 similar to the spring 19 of the first hinge 10, adapted to return the control device 21 to the locked position.

The internal operation of the second hinge 20 is similar to that of the first hinge 10 and will not be detailed again here.

To be able to be controlled synchronously by the handle 8, the control device 11,21 of the first and second hinges 10,20 are connected to each other by the control shaft 3.

The second end portion 62 comprises three external ribs 67 or lobes 77, distributed along the edge, each external rib 67 extending in the axial direction. Each external rib 67 is received in one of the internal grooves 18 arranged in the cam 21b, as illustrated in FIG. 10.

Also, in the rest position of the control shaft 3 as illustrated in FIGS. 9 and 10, the lobes 77 and ribs 67 do not directly touch the cam 2 or cam 21b. The angle of play, also called lost motion, corresponds to the interval denoted 'e' (see FIG. 10) and is intentionally arranged to avoid any metal on metal contact when no force is being applied to the handle, which is most of the time. This angle of play is delimited by the rest position already described for the control shaft and each of the unlocked positions of the hinges 10 and 20. The value of this angle of play may be between 3 and 10 degrees. This play may be allowed for in the first hinge 10 or in the second hinge 20, or in both at once as represented in the figures.

Similarly, in the radial direction, each driving lug 63 is placed between the tip of the lobes 77 or ribs 67 and the bottom of the groove 18, thus radially avoiding any potentially noisy contact of metal on metal.

In a second embodiment, not represented in the figures, some elements differ from those of the first embodiment as will be described below, whereas all the elements that are the same or similar will not be described again.

The first hinge 10 and if applicable the second hinge 20 allow continuous adjustment, as is known in the prior art and described in detail for example in documents U.S. Pat. No. 5,209,637 or FR2770810. In particular, the first hinge 10 (and if applicable the second hinge 20 if present) may comprise a hypocycloid gear design which comprises a first set of teeth arranged on the first plate 81 and a second set of teeth arranged on the second plate 82 or connected to said second plate 82. The second set of teeth has a smaller diameter and number of teeth than the first set of teeth; the second set of teeth engages with said first set of teeth only in a narrow section of the circumference.

The control device 11 is in the form of an eccentric cam which pivots relative to the first plate and pushes the element supporting the second set of teeth so that the area of engagement along the circumference is angularly offset. Thus the rotation of a complete turn of the eccentric cam causes a hypocycloid movement of the element supporting the second set of teeth and angularly offsets it by the difference in the number of teeth of the first and second sets of teeth.

The eccentric cam comprises an axial opening 13a with which the control shaft 3 engages in the same manner as described above for the first embodiment. The grooves 18 cooperate with the projecting lobes 77 of the drive portion 70 of the control shaft, so that said control shaft 3 rotates the eccentric cam similarly to what was described for the first embodiment.

In this embodiment, the control shaft 3 may be rotated over several revolutions by actuating the handle 8 which is a knob in this case.

The axial immobilization along Y is similar to what was described for the first embodiment, meaning the stop element 30 presses against the first plate in the direction of insertion, while the free ends 41 of the plastic tabs 4 move apart due to their inherent outward elastic force and press against the lateral face of the cam. The installation of the control shaft 3 is therefore done by hand, without tools, whether assembling the configuration with a single hinge 10 or the configuration having the first and second hinges 10,20 located on each side of the seat.

The invention claimed is:

1. A hinge of an automotive vehicle seat, which allows adjusting the angle of a first seat element relative to a second seat element about a primary hinge axis, and comprising:
    first and second hinge plates, intended to be rigidly and respectively attached to said first and second seat elements,
    a control device which moves the first hinge plate relative to the second hinge plate,
    a control shaft, centrally arranged and distinct from the control device, said control shaft being received in axial openings in the first and second hinge plates, and received in an axial opening in the control device, said control shaft being held in the direction of the main axis by a snap-in means, the snap-in means comprising elastic plastic tabs having free ends which can move radially, and said control shaft comprising at least one stop element adapted to stop the control shaft in a first axial direction, while free ends of the plastic tabs come in stopping configuration to stop the control shaft in a second axial direction opposite the first axial direction, such that the control shaft can be assembled manually without tools.

2. The hinge according to claim 1, wherein the control device is adapted to move locking elements which immobilize the first hinge plate relative to the second hinge plate, wherein the control shaft is adapted to rotate said control device about the main axis.

3. The hinge according to claim 2, wherein the control device comprises: a cam adapted to push the locking elements outwards into the locked position, and having grooves; and a control plate adapted to move said locking elements inward to the unlocked position, and having driving lugs housed in said grooves.

4. The hinge according to claim 1, wherein the plastic tabs are arranged on the control shaft.

5. The hinge according to claim 1, wherein the control shaft comprises a connecting rod, a control hub, and an annular ring supporting said elastic plastic tabs.

6. The hinge according to claim 5, wherein the control hub is force fitted or crimped onto the connecting rod, the annular ring being axially placed between the control hub and the connecting rod.

7. The hinge according to claim 5, wherein the annular ring comprises three tabs of different lengths.

8. The hinge according to claim 5, wherein the control hub comprises three lobes projecting radially outwards and arranged along the circumference about 120° apart from each other, and wherein the annular ring comprises three elastic plastic tabs each arranged along the circumference between two lobes.

9. An angle adjustment device for a vehicle seat, comprising a first hinge according to any one of the above claims, the control device of the first hinge being a first control device and the control shaft of the first hinge being a first control shaft, said adjustment device additionally comprising a second hinge comprising:
    third and fourth hinge plates intended to be rigidly and respectively attached to said first and second seat elements,
    a second control device adapted to move second locking elements which immobilize the third hinge plate relative to the fourth hinge plate,
    the control shaft being received in axial openings in the third and fourth hinge plates, and received in an axial opening in said second control device, and adapted to cause the second control device to rotate about the main axis,
wherein the control shaft is returned to a rest position by a return element, and the second control device is returned to a locked position by a spring, the rest position being separated by an angle of play from the position in which the control shaft applies force to the second control device starting from its locked position.

10. The angle adjustment device according to claim 9, wherein the first seat element is a seat bottom and wherein the second seat element is a seat back.

11. A vehicle seat comprising at least one hinge according to claim 1.

12. A vehicle seat comprising an angle adjustment device according to claim 9.

* * * * *